United States Patent [19]

Güsewell et al.

[11] Patent Number: 4,922,690
[45] Date of Patent: May 8, 1990

[54] ROUND BALER

[75] Inventors: Eike Güsewell; Hans-Peter Wölfle, both of Gottmadingen; Egon Maier, Hilzingen-Riedheim, all of Fed. Rep. of Germany

[73] Assignee: Greenland GmbH & Co. KG, Gottmadingen, Fed. Rep. of Germany

[21] Appl. No.: 349,660

[22] Filed: May 10, 1989

[30] Foreign Application Priority Data

May 11, 1988 [DE] Fed. Rep. of Germany ....... 3816219

[51] Int. Cl.⁵ ...................... B65B 11/56; B65B 13/00; B65B 27/12; B65B 41/12
[52] U.S. Cl. ...................... 53/587; 53/389; 83/658
[58] Field of Search ................ 53/118, 552, 587, 389; 83/658, 659

[56] References Cited

U.S. PATENT DOCUMENTS 3,677,122  7/1972  Rautine ........................... 83/659 X
4,254,601  3/1981  Prager et al. ..................... 53/552 X
4,353,196  10/1982 Beer et al. ........................ 53/552 X
4,407,113  10/1983 Core ................................. 53/587 X
4,517,790  5/1985  Kreager ........................... 53/552
4,563,854  1/1986  Ackermann et al. ............. 53/587 X
4,580,398  4/1986  Bruer et al. ..................... 53/118 X
4,604,929  8/1986  Vallance .......................... 83/658 X

FOREIGN PATENT DOCUMENTS 3418681  11/1985  Fed. Rep. of Germany ........ 53/587
2128542  5/1984  United Kingdom ................. 53/118

Primary Examiner—John Sipos
Assistant Examiner—Beth Bianca
Attorney, Agent, or Firm—Nilles & Nilles

[57] ABSTRACT

The round baler for agricultural stalk crops comprises a round-bale wrapping device with a netting web, as well as a separation device for severing the netting web. Said device consists of a beating knife bar and an anvil which is formed as a countercutter and stationarily mounted on the frame and whose surface which is acted upon by the beating knife bar is provided with a plurality of parallel spaced-apart recesses.

12 Claims, 2 Drawing Sheets

ROUND BALER

The present invention relates to a round baler for agricultural stalk crops comprising a wrapping device for wrapping a round bale with a netting web, with a supply roll arranged parallel to the center axis of the pressing chamber being provided for the netting web, as well as an actuable take-off device for unwinding the netting web from the supply roll and for introducing the netting web into the pressing chamber, and a separation device for severing the netting web between supply roll and pressing chamber, the separation device consisting of a pivotable beating knife bar which is adapted to be biased against spring means, and of an anvil which is formed as a counteredge and stationarily mounted on the frame.

Round balers are increasingly found because of their high performance of several hectares per hour, whereby even short fair-weather times can be made use of. Most of such balers are round balers, with the stalk crops supplied by a pick-up device to the pressing chamber being formed by press rollers, which are disposed on the circumference of the pressing chamber, into a round bale which is subsequently tied.

Tying can here be carried out by means of a baler twine guided by a twine guiding arm, the formed round bale being encircled by the baler twine several times to achieve a sufficient binding strength in this way. Such an operation, however, still takes a lot of time.

To speed up the tying operation and to increase the binding strength at the same time, it was already suggested (German patent application No. 29 30 590) that the round bale should be wrapped with a foil or fabric, with a take-off and separation device to be operated manually via cable pulls (Bowden cables) being provided. The separation device consists here of a knife bar which is pivoted into the path of the unwinding fabric during the wrapping operation when the desired wrapping number is achieved so as to cut it off with a drawing cut. This results in an inaccurate separation of the material and a poor in-feed of the fabric during the next wrapping cycle because the inaccurately separated end of the fabric does not come into planar contact with the outer side of the round bale.

Furthermore, German patent application No. 34 18 681 discloses a roll baler for agricultural stalk crops comprising an enveloping device, wherein the separation device for the cover web, with which the roll bale is wrapped, consists of a pivotable beating knife bar which cooperates with an anvil formed as a counteredge. The beating knife bar strikes here with its sharp cutting edge against a plane surface of the anvil formed as a steel bar, the direction of impact of the beating knife bar being about perpendicular to the direction of traction of the enveloping material.

With a new beating knife and a new anvil clean-cut separation edges which come into good contact with the outer side of the round bale are achieved with the help of such a device, with the ends being reliably taken along at the beginning of the next wrapping cycle.

It has however been found that after long operation times the smooth surface of the anvil, as well as the cutting edge of the beating knife itself become notched so that individual longitudinal threads of the covering material are not cut off during the separation operation, which may result in considerable problems.

It is the object of the present invention to avoid these disadvantages and to provide a round baler in the case of which even after long operation times perfect clean-cut separation edges are accomplished when the wrapping material is cut off.

On the basis of a round baler of the type shown in greater detail at the outset, the present invention suggests for the achievement of this object that the surface of the anvil which is acted upon by the beating knife bar should be provided with a plurality of parallel spaced-apart recesses.

The cross section of each recess may here be V-shaped, with the sides of the V being of the same or different length, or it may be semicircular.

The present invention has the advantage that a smooth clean cut of the netting web, with which the round ball is wrapped, is accomplished at any time by means of the V-shaped or semi-circular longitudinal grooves provided in the anvil and arranged parallel to the striking beating-knife bar. This is especially achieved by the measure that the beating knife bar has a certain elasticity and is somewhat deformed in the direction of its movement upon vigorous impact on the anvil so that when entering into the recess next to it, it even cuts off those longitudinal threads of the netting web that have not been cut off upon immediate impact, e.g. because of the presence of a notch.

The present invention will now be explained in greater detail with the help of the drawing in which an advantageous embodiment is illustrated and in which FIG. 1 diagrammatically shows a cross section through a round baler including a separation device of the invention;

Figure 1:
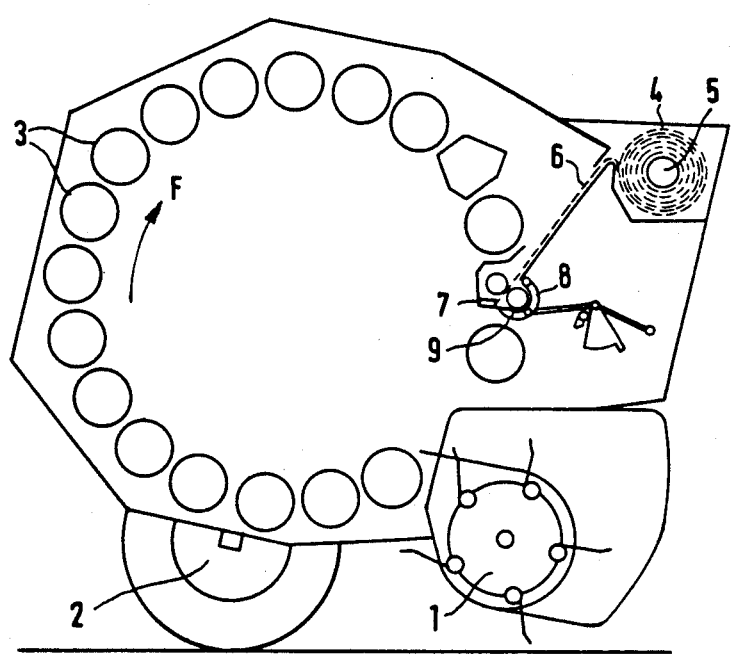

FIG. 1 diagrammatically shows a section through a conventional round baler comprising a two-part pressing chamber housing supported via a running wheel 2 on the ground and provided with a plurality of press rollers 3 which define the pressing chamber. The agricultural stalk crops are supplied by a conventional pick-up device 1 to the interior of the pressing chamber, with a round bale (not shown) which rotates in the direction of arrow F being formed.

Numeral 4 designates a supply roll for the wrapping material for the completed round bale; said material may for instance consist of a netting web 6 which after formation of the round bale is guided therearound. The netting web can be drawn over a deflection edge and a baffle plate and passed between two take-off rollers. A separation device for severing the netting web after wrapping of the round bale is designated by 7, 8, 9. A knife support 8 including a beating knife 9 forms the bearing knife bar which by the action of a suitable spring vigorously strikes against an anvil mounted stationarily on the frame to thereby cut off the netting web 6 over its whole width. The anvil 7 may here consist of a bright flat steel having a surface 12 against which the beating knife 9 strikes with its front edge 11. It can be seen from FIG. 2 that as a result of the great impact force a slight deformation (11') of the beating knife 9 occurs when the latter strikes against the surface 12.

Figure 3:
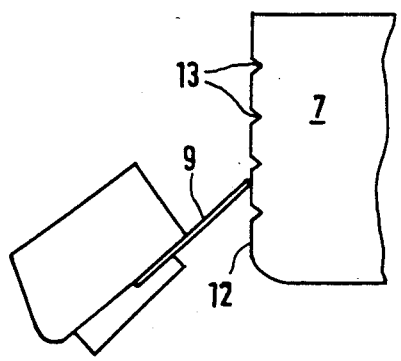
FIGS. 3 to 5 show three cross-sections through the anvil with different cross-sections of the recesses.
Figure 4:
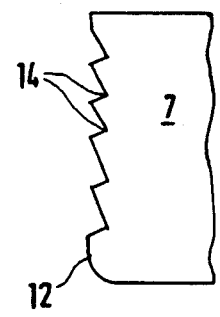
Figure 5:
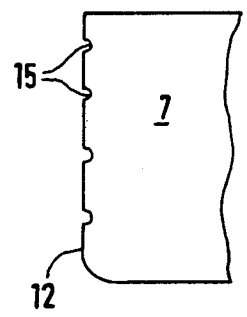

According to the invention the surface 12 of the anvil 7 against which the beating knife 9 strikes is now provided with a plurality of parallel spaced-apart recesses 13, 14, 15 which extend parallel to the longitudinal edge of the beating knife 9 (FIGS. 3, 4, 5). According to FIG. 3 said recesses may be V-shaped with the sides of the V having the same length, or, according to FIG. 4, they may be V-shaped with the sides of the V being of different length, or, however, as is shown in FIG. 5, they may be semicircular.

Figure 2:
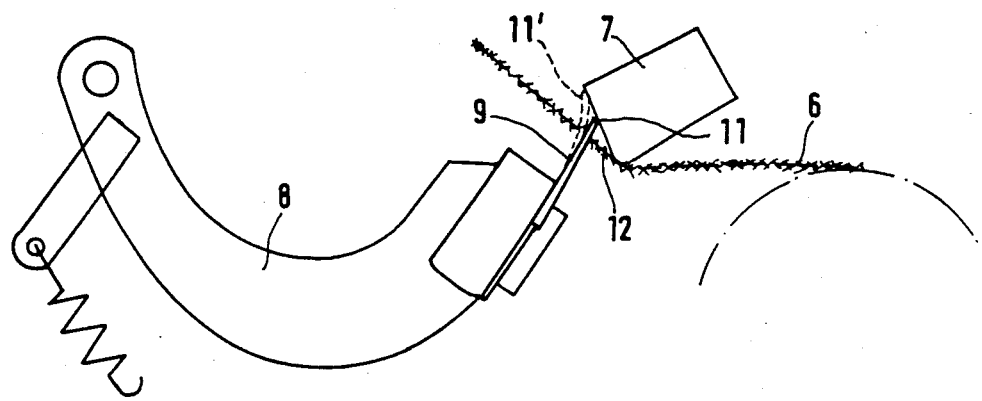
FIG. 2 is an enlarged view of beating knife bar and anvil.

Upon impact of even a notched beating-knife bar on said surface 12 of the anvil 7, the beating knife 9 is deformed slightly, as is shown in FIG. 2, and enters into one of the recesses 13, 14, 15 so that even with a notched beating knife the individual longitudinal threads of the netting web 6 are accurately cut off.

The beating knife bar, i.e. the moment at which the separation operation is initiated, is controlled in the conventional way through triggering segments, articulated axles of coupling bars, tension springs and, for instance, a stepping mechanism.

We claim:

1. A round baler for agricultural stalk crops comprising a wrapping device for wrapping a round bale with a netting web, with a supply roll arranged parallel to the center axis of the pressing chamber being provided for said netting web, an actuatable take-off device for unwinding said netting web from said supply roll and for introducing said netting web into said pressing chamber, and a separation device for severing said netting web between said supply roll and said pressing chamber, said separation device consisting of a pivotable beating knife bar having a cutting edge extending across the width of said web which said knife bar is adapted to be biased against spring means, and of an anvil which is formed as a counteredge and stationarily mounted on the frame, characterized in that the surface (12) of said anvil (7) which is acted upon by said beating knife bar is provided with a plurality of parallel spaced-apart recesses (13, 14, 15) continuously extending parallel to said beating knife bar edge.

2. The round baler according to claim 1, characterized in that the cross section of each recess (13) is V-shaped and that the sides of the V have the same length.

3. The round baler according to claim 1, characterized in that the cross section of each recess (14) is V-shaped and that the sides of the V are of different length.

4. The round baler according to claim 1, characterized in that the cross section of each recess (15) is semicircular.

5. The round baler according to claim 1, characterized in that the beating knife bar is elastic and capable of deforming in the direction of its movement upon impact with said anvil.

6. The round baler according to claim 5, characterized in that said beating knife bar is, upon deformation caused by impact with said anvil, capable of entering one of said recesses.

7. A round baler comprising:
a pressing chamber having an axis for baling a product;
a supply roll arranged parallel to the axis of the pressing chamber for providing a netting web;
means for unwinding a netting web along a path from the supply roll to the pressing chamber and means for wrapping a netting web around a product being baled in the pressing chamber;
a pivotable beating knife bar having a cutting edge extending across the width of said web and positioned on one side of the path at a point between the supply roll and pressing chamber for separating a netting web; and
an anvil positioned on the opposite side of the path from the beating knife bar, and having a surface having a plurality of parallel spaced-apart recesses continuously extending parallel to the beating knife bar edge.

8. A round baler as described in claim 7, wherein the cross section of each recess is V-shaped and the sides of the V have the same length.

9. A round baler as described in claim 7, wherein the cross section of each recess is V-shaped and the sides of the V are of different length.

10. A round baler as described in claim 7, wherein the cross section of each recess is semicircular.

11. A round baler as described in claim 7, wherein the beating knife bar is elastic and capable of deforming in the direction of its movement upon impact with the anvil.

12. A round baler as described in claim 11, wherein the beating knife bar is, upon deformation caused by impact with the anvil, capable of entering one of the recesses.

* * * * *